(12) United States Patent
Tran et al.

(10) Patent No.: US 8,274,860 B2
(45) Date of Patent: Sep. 25, 2012

(54) DISTANCE MEASUREMENT APPARATUS AND RELATED METHODS

(75) Inventors: Sang Tran, West Midlands (GB); Keith Victor Beard, Worcester (GB)

(73) Assignee: Pulsar Process Measurement Ltd., Worcestershire (GB)

( * ) Notice: Subject to any disclaimer, the term of this patent is extended or adjusted under 35 U.S.C. 154(b) by 277 days.

(21) Appl. No.: 12/597,680

(22) PCT Filed: Apr. 28, 2008

(86) PCT No.: PCT/GB2008/001477
§ 371 (c)(1),
(2), (4) Date: Oct. 26, 2009

(87) PCT Pub. No.: WO2008/132470
PCT Pub. Date: Nov. 6, 2008

(65) Prior Publication Data
US 2010/0128569 A1    May 27, 2010

Related U.S. Application Data

(60) Provisional application No. 60/944,316, filed on Jun. 15, 2007.

(30) Foreign Application Priority Data

Apr. 28, 2007  (GB) ................................. 0708271.2

(51) Int. Cl.
*G01F 23/296* (2006.01)
*G01S 15/10* (2006.01)
(52) U.S. Cl. .......................................... 367/99; 367/902
(58) Field of Classification Search .................. 367/902, 367/99
See application file for complete search history.

(56) References Cited

U.S. PATENT DOCUMENTS
4,145,914 A * 3/1979 Newman ..................... 367/902
(Continued)

FOREIGN PATENT DOCUMENTS
GB            236023         7/1925
(Continued)

OTHER PUBLICATIONS

International Search Report and Written Opinion issued on Aug. 18, 2008 for PCT/GB2008/001477.

(Continued)

*Primary Examiner* — Daniel Pihulic
(74) *Attorney, Agent, or Firm* — Fox Rothschild LLp; Gerard P. Norton

(57) ABSTRACT

A distance measurement apparatus arranged to measure the distance to an object (106) comprising a first sonic transmitter (100) arranged at a first distance (h1) from that object and a second sonic transmitter (102) arranged at a second distance (h2) from that object (100), wherein the first and second distances are different, the first (100) and second (102) transmitters being controlled by processing circuitry (108) and the first and second transmitters being arranged such that sonic pulses emitted, in use, thereby are incident upon that object (106) and the apparatus further comprising at least one sonic receiver (100) arranged to receive a plurality of reflected sonic pulses and generate an output therefrom and the processing circuitry (108) being arranged to receive the output, determine the times since the first and second pulses were emitted and generate a distance to that object from the determined times.

17 Claims, 3 Drawing Sheets

U.S. PATENT DOCUMENTS

| | | | |
|---|---|---|---|
| 5,842,374 | A | 12/1998 | Chang |
| 6,738,312 | B1 | 5/2004 | Tan et al. |
| 2002/0064090 | A1 | 5/2002 | Su |
| 2005/0072226 | A1 | 4/2005 | Pappas et al. |
| 2006/0133209 | A1* | 6/2006 | Bruinsma et al. ............. 367/902 |
| 2006/0215492 | A1 | 9/2006 | Campbell |
| 2010/0128569 | A1* | 5/2010 | Tran et al. ........................ 367/99 |

FOREIGN PATENT DOCUMENTS

| | | | |
|---|---|---|---|
| JP | 55152476 | A | 11/1980 |
| JP | 57024567 | U | 2/1982 |
| JP | 57100361 | | 6/1982 |
| JP | 61174628 | U | 10/1986 |
| JP | 1043786 | A | 2/1989 |
| JP | 5109953 | A | 4/1993 |
| JP | 6066620 | | 3/1994 |
| JP | 11083600 | | 3/1999 |
| JP | 2005233640 | A | 9/2005 |
| WO | WO 2008132470 | A1 * | 11/2008 |

OTHER PUBLICATIONS

Search Report prepared by the UK Intellectual Property Office, Oct. 2007.
Examiner's First Report on Patent Application No. 2008243991 by Pulsar Process Measurement Limited, Oct. 2011.
Translation of the Notification of First Office Action prepared by the Patent Office of the People's Republic of China, Jul. 2010.
Translation of the Notification of the Second Office Action prepared by the Patent Office of the People's Republic of China, Jun. 2011.
Translation of the Notification of the Third Office Action prepared by the Patent Office of the People's Republic of China, Mar. 2012.
First European Office Action, Feb. 2012.

* cited by examiner

DISTANCE MEASUREMENT APPARATUS AND RELATED METHODS

CROSS REFERENCE TO RELATED APPLICATION

The present application is a 35 U.S.C. §371 National Phase application of International Application Serial No. PCT/GB2008/001477 filed Apr. 28, 2008, which claims priority from, United Kingdom Application No. GB0708271.2 filed Apr. 28, 2007 and U.S. Provisional Patent Application No. 60/944,316 filed on Jun. 15, 2007, the contents of which are hereby incorporated by reference.

FIELD OF THE INVENTION

This invention relates to a distance measurement apparatus and related methods. In particular, but not exclusively, the invention relates to an apparatus and method for measuring the level of a fluid in a tank, channel or the like. More specifically, but again not exclusively, an apparatus and a method for determining fluid flow based upon a level measurement are provided.

BACKGROUND OF THE INVENTION

Ultrasound is commonly used to measure distances to an object. In many embodiments this measurement is achieved by the transmission of an ultrasonic pulse from a transmitter and subsequently timing how long it takes for the reflection of that pulse to be received from the object. Often a transceiver is used wherein the transmitter is used both to generate the ultrasonic pulse and receive the reflection. The time that the pulse has taken to reach the object and return can be used to calculate the distance to the object if the speed of sound in the medium in which the sound pulse has been transmitted is known.

The accuracy of this technique is affected by various factors which include the component fluids, which would generally be gases, which make up the medium in which the sound pulse travels and the temperature of the medium. If either the component fluids or the temperature varies then the speed of sound changes and the calculation is inaccurate.

It is often necessary to measure the level of a liquid within a container and such level measurement provides one example of a distance measurement which has been made using ultrasound. In some situations, such as in a tank, this is useful to determine the volume of liquid in the container. In other situations, such as within a primary element of a flume or weir, this is useful to determine the rate at which fluid flows through the primary element.

In addition to measuring the level of fluid in a container or flume it is also known to use ultrasound to measure the distance to an object and be incorporated into devices such as collision detectors, distance measuring devices and the like.

In one particular application, given by way of example only but which is convenient to describe, measuring the rate of flow is becoming more important as companies are being monitored more closely as to how much waste they discharge and are being charged accordingly. It is therefore desirable to be as accurate as possible.

As discussed above one prior art technique of determining a level is to use an ultrasonic pulse. However, in an outside environment the temperature, and thus the speed of sound in air, varies by on the order of 50° Celsius over the operating conditions which may be experienced.

Techniques have been proposed which try to reduce this problem. Such techniques have included providing temperature sensors. However, simply providing a temperature sensor does not provide a suitable solution since direct radiated heat from the sun may cause a false reading, there may be too much lag in the reading taken by the sensor, etc.

It is known to provide shielding to shield the sensor from direct sun light however, such shielding can itself provide a further thermal mass which increases the lag experienced by the sensor.

It is also known to provide reference distances, by provision of a peg or the like. The reference distance can allow any measurements that have been taken to be corrected for temperature variation; since the reference distance is known then readings can be adjusted until calculations give the correct distance for the reference distance. However, such techniques are only accurate whilst the reference distance is accurate. Foreign bodies can become deposited on the peg, etc., for example, when a flood occurs, ice may form on the peg, etc. all of which can seriously affect the accuracy of readings taken.

SUMMARY OF THE INVENTION

According to a first aspect of the invention there is provided a distance measurement apparatus arranged to measure the distance to an object comprising a first sonic transmitter arranged at a first distance from that object and a second sonic transmitter arranged at a second distance from that object, wherein the first and second distances are different, the first and second transmitters being controlled by processing circuitry and the first and second transmitters being arranged such that sonic pulses emitted, in use, thereby are incident upon that object and the apparatus further comprising at least one sonic receiver arranged to receive a plurality of reflected sonic pulses and generate an output therefrom, and the processing circuitry being arranged to receive the output, determine the times since the first and second pulses were emitted and generate a distance to that object from the determined times.

Such an apparatus is thought to be advantageous because use of the two sensors allows a measurement of the distance to an object to be made which is generally insensitive to temperature.

The use of two transmitters is advantageous because it increases the power transmitted within the system which should make the distance measurement less prone to error, more immune to noise, etc. Furthermore, determining the distance from at least one receiver is believed to be advantageous since this removes the need to synchronise the signals received from more than one receiver, does not introduce the possibility of different gains being applied by each receiver circuit, etc.

Generally, the first and second transmitters are caused to emit a sonic pulse at substantially the same time which helps reduce the complexity of the calculations that are performed in order to calculate the distance to the object. In other embodiments it would be possible to cause the first and second transmitters to generate sonic pulses at different times.

Conveniently, the first and second transducers are arranged to emit ultrasound.

In one embodiment, at least one of, and possibly both of the first and second transducers comprises a transceiver; i.e. a device which is arranged to act as both a receiver and a transmitter. As such, the receiver may be provided by the same device as one of the transmitters. Such a device may be convenient since it may provide the required functionality within a more compact space.

In other embodiments a receiver may be provided as a separate device from either of the transmitters. In such an embodiment it would be convenient if the receiver were mounted at substantially the same distance from an object to be measured as one of the transmitters.

Generally both of the first and second transmitters are arranged such that they emit a sonic pulse which is generally along a line perpendicular to the object. However, it is convenient if the first and second transmitters are offset from one another, in a direction substantially transverse to a perpendicular line to the object to be measured from the transmitter. Such an arrangement is convenient as can prevent one of the two transmitters from obstructing the signal emitted by the other of the transmitters such as, for example, if the transmitters were in line with one another. Generally, the offset is small such that the or each receiver of the transmitted pulse still receives the plurality of sonic pulses along a line generally perpendicular to the object.

In some embodiments, the object to which a distance is to be measured comprises the surface of a liquid. Such an embodiment may provide a level measurement apparatus which would find utility in an apparatus such as determining the level of fluid in a tank.

The apparatus may be provided in association with a weir or flume and the object to which a distance is to be measured comprises the surface of a liquid flowing through the weir or flume. In such an embodiment, the processing circuitry may be arranged to calculate the flow of liquid through a channel in which the weir or flume is positioned.

According to a second aspect of the invention there is provided a method of measuring the distance to an object, the method comprising
1. timing a first time of flight of a first sonic pulse emitted from transmitter at a first distance from the object;
2. timing a second time of flight of a second sonic pulse emitted from transmitter at a second distance from the object;
3. using the first and second time of flights to calculate the distance from a receiver, used to receive the sonic pulses, to the object.

Generally, the method will cause the sonic pulses to be emitted from transmitters at substantially the same time which can help to reduce the complexity of the calculation of the distance to the object.

Conveniently, the sonic pulses comprise ultrasound.

The method may comprise using one of the transmitters as a receiver. Such a method can help to reduce the complexity of the apparatus needed and also help to simplify the calculations needed to determine the distance to the object.

The method may in particular measure the distance to the surface of a liquid; i.e. the object may comprise the surface of a liquid. Such a method may find application in measuring the level of a fluid in a tank or the like. In other embodiments the method may be used to determine the rate of flow of liquid in a channel.

The method of the second aspect of the invention may comprise and of the features discussed in relation to the first aspect of the invention.

According to a third aspect of the invention there is provided a kit comprising a first and a second transceiver which are arranged to be configured to provide either the first or second aspects of the invention. According to a fourth aspect of the invention there is provided a machine readable medium containing instructions which when read by a processing circuitry cause that processing circuitry to provide the method of the second aspect of the invention.

According to a fifth aspect of the invention there is provided a flow measurement apparatus arranged to be positioned above a channel comprising a first sonic transmitter arranged at a first height above a surface to be measured and a second sonic transmitter arranged at a second height above a surface to be measured, wherein the first and second heights are different, the first and second sensors being controlled by processing circuitry, the first and second sensors being arranged such that sonic pulses emitted, in use, thereby are incident upon that surface and the apparatus further comprising at least one sonic receiver arranged to receive a plurality of reflected sonic pulses and generate an output therefrom, and the processing circuitry being arranged to receive the output, determine the times since the first and second pulses were emitted and generate a distance to the surface from the determined times and being further arranged to calculate the flow of a liquid through the channel from the distance to the surface.

According to a sixth aspect of the invention there is provided a machine readable medium containing instructions which when read by a processing circuitry cause that processing circuitry to perform as the apparatus of the first or sixth aspects of the invention.

The machine readable medium referred to above may be any of the following: a floppy disk, a CD ROM/RAM, a DVD ROM/RAM (including –R/–RW or +R/+RW), an HD DVD, a Blu Ray™ disc, a hard drive, a memory (including an SD card, a Memory Stick™, Flash card, memory stick, etc or any semiconductor memory), a transmitted signal (including an Internet download, an FTP transfer, or the like), a wire.

BRIEF DESCRIPTION OF THE DRAWINGS

There now follows, by way of example only, a detailed description of the invention with reference to the accompanying Figures of which.

DETAILED DESCRIPTION OF THE DRAWINGS

Figure 1:
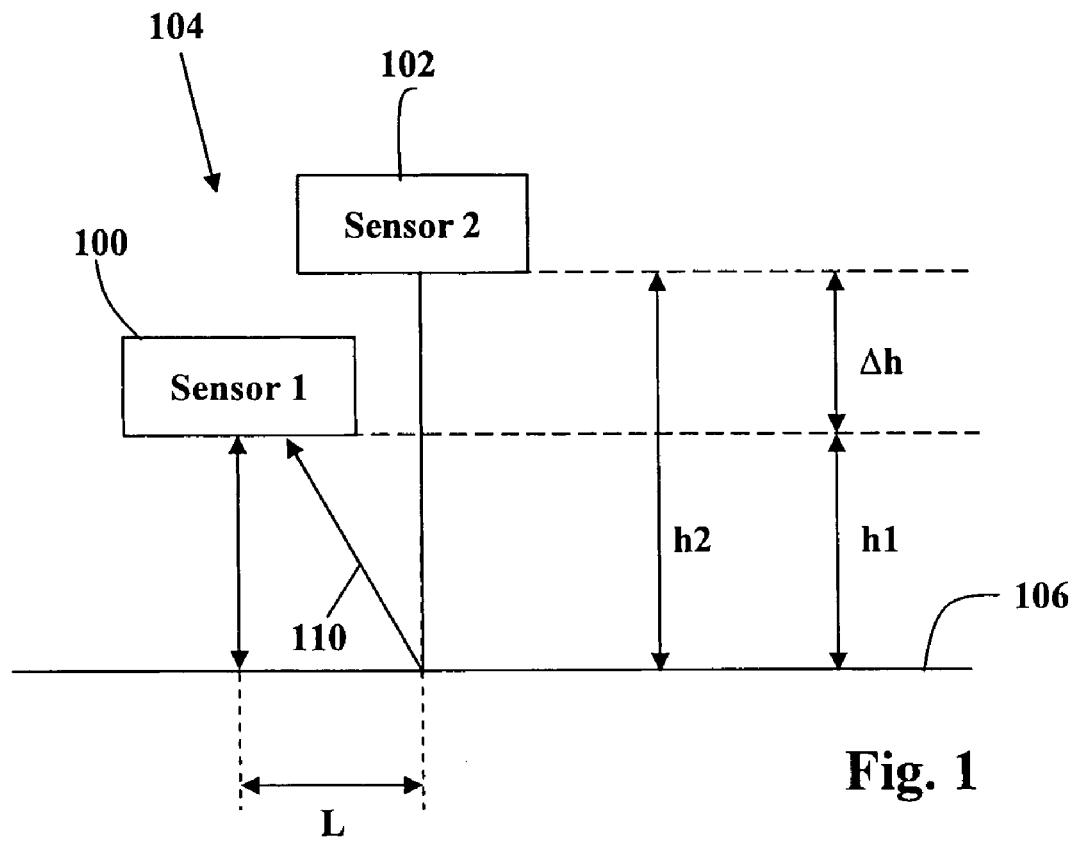
FIG. 1 schematically shows how an embodiment of the invention is arranged.

FIG. 1 shows how a first sensor 100 and a second sensor 102 are arranged within a distance measurement apparatus 104 above a surface 106. In this embodiment the surface provides an object to which it is desired to know the distance. The surface could for example be the surface of a liquid in a tank, or in a channel or it could be part of an object that it is desired to avoid using a collision avoidance system, or the like.

The first sensor 100 is positioned at a first height h1 above the surface and the second sensor 102 is positioned at a second height h2 above the surface.

In this embodiment both of the first sensor 100 and the second sensor 200 are transceivers; that is they are arranged to be both transmitters to transmit sonic pulses toward the surface 106 and also as receivers arranged to receive sonic pulses reflected from the surface 106. In other embodiments the first 100 and second 102 sensors need not be transceivers and could be a separate transmitter and a separate receiver. In some embodiments only a single receiver is provided.

In this embodiment, the first 100 and second 102 sensors are arranged to emit and receive ultrasonic sonic pulses. The pulses emitted by the sensors 100, 102 are substantially perpendicular to the surface 106. The second sensor 102 is offset, in a direction transverse a line perpendicular from the surface 106 to the second sensor 102, by a distance L. This offset ensures that the first sensor 100 does not obstruct the sonic pulse emitted by the second transmitter 102.

Figure 2:
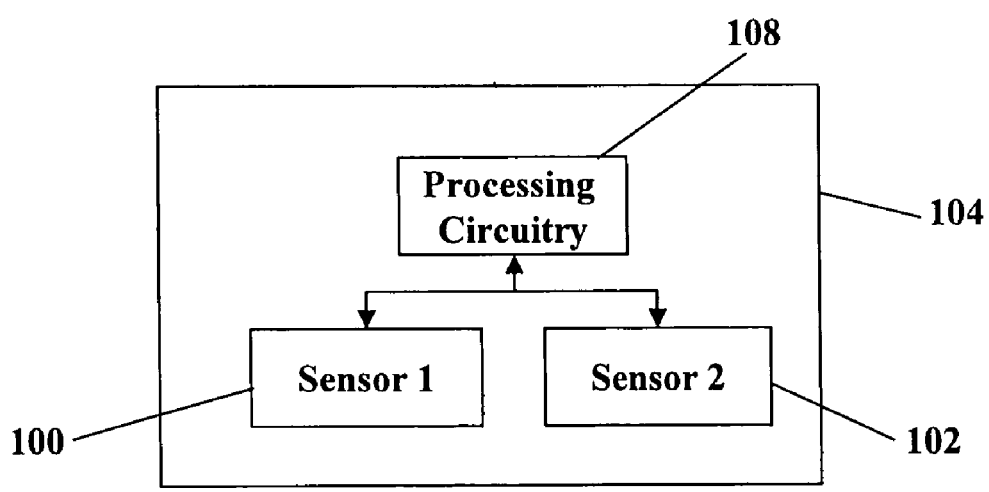
FIG. 2 shows components of an embodiment of the invention.

As seen from FIG. 2 each of the first 100 and second 102 sensors is connected to processing circuitry 108. The processing circuitry 108 controls when the sensors 100, 102 emit a pulse and also processes the outputs generated by the sensors 100, 102 when they receive a reflected pulse 110 from the surface 106. In the embodiment being described the processing circuitry 108 is arranged to receive an output from only the first sensor 100. In other embodiments, the processing circuitry could be arranged to receive outputs from both sensors 100, 102 or could be arranged to receive the output from the second sensor 102.

The distance of offset L between the first and second sensors 100, 102 is small such that the reflected pulse 110 received but the first sensor 100 has still traveled substantially perpendicularly to the surface 106 to the first sensor 100. However the processing circuitry 108 may be arranged to apply a correction to its determination of the heights h1 and/or h2 to account for the offset L.

The processing circuitry will generally comprise a processor and associated memory which together are arranged to execute software to cause the processing circuitry to function as desired. In such embodiments, the processor may be, or may be similar to a Pentium™, or Athlon™ class processor. In other embodiments, the processing circuitry does not contain a processor and comprises dedicated circuitry (which might be analogue components and/or Field Programmable Gate Arrays (FPGA's) or the like arranged to provide the desired functionality.

Figure 4:
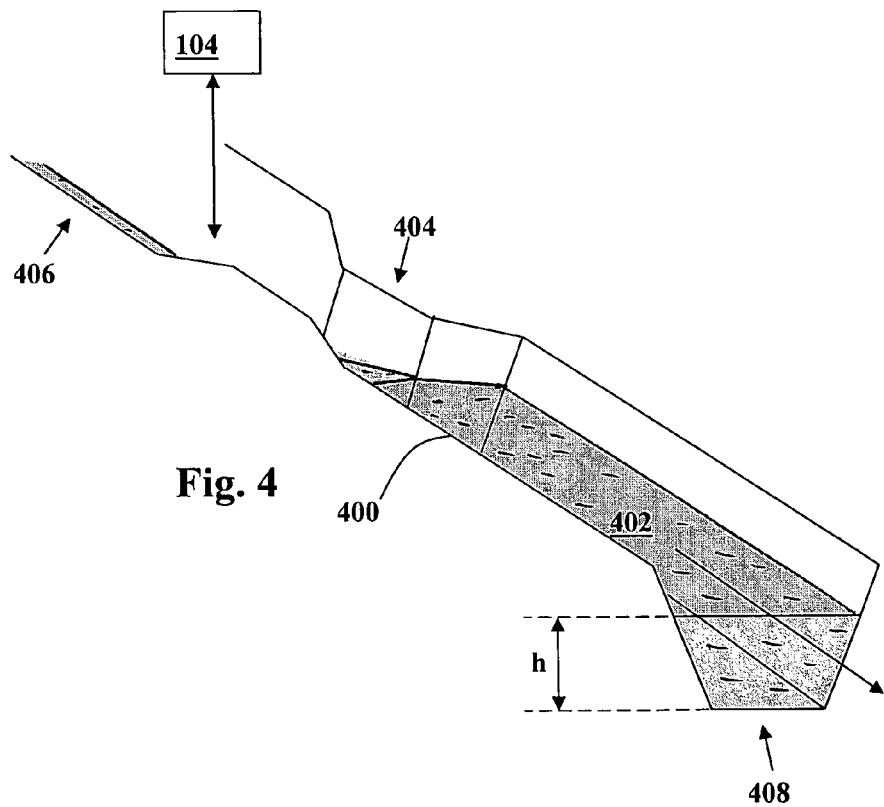
FIG. 4 is a schematic diagram of how an embodiment of the current invention may be used.

FIG. 4 schematically shows one possible embodiment in which the distance measurement apparatus may be used. In this embodiment the distance measurement apparatus is providing a flow measurement apparatus.

FIG. 4 shows a channel 400 through which a liquid 402 flows. The channel 400 comprises a contraction 404 which causes liquid flowing in a fast flowing manner at an entry end region 406 of the channel to change to a slow moving liquid at an exit end region 408 via a hydraulic jump. In such an arrangement, the depth of the liquid 402 in the entry end region 406 is directly proportional to the speed of the liquid. Thus, if the level of the liquid is determined the flow of the liquid can be calculated. Thus, a level measurement apparatus 104 as described in relation to FIGS. 1 and 2, may be positioned above the entry end region 406.

Figure 5:
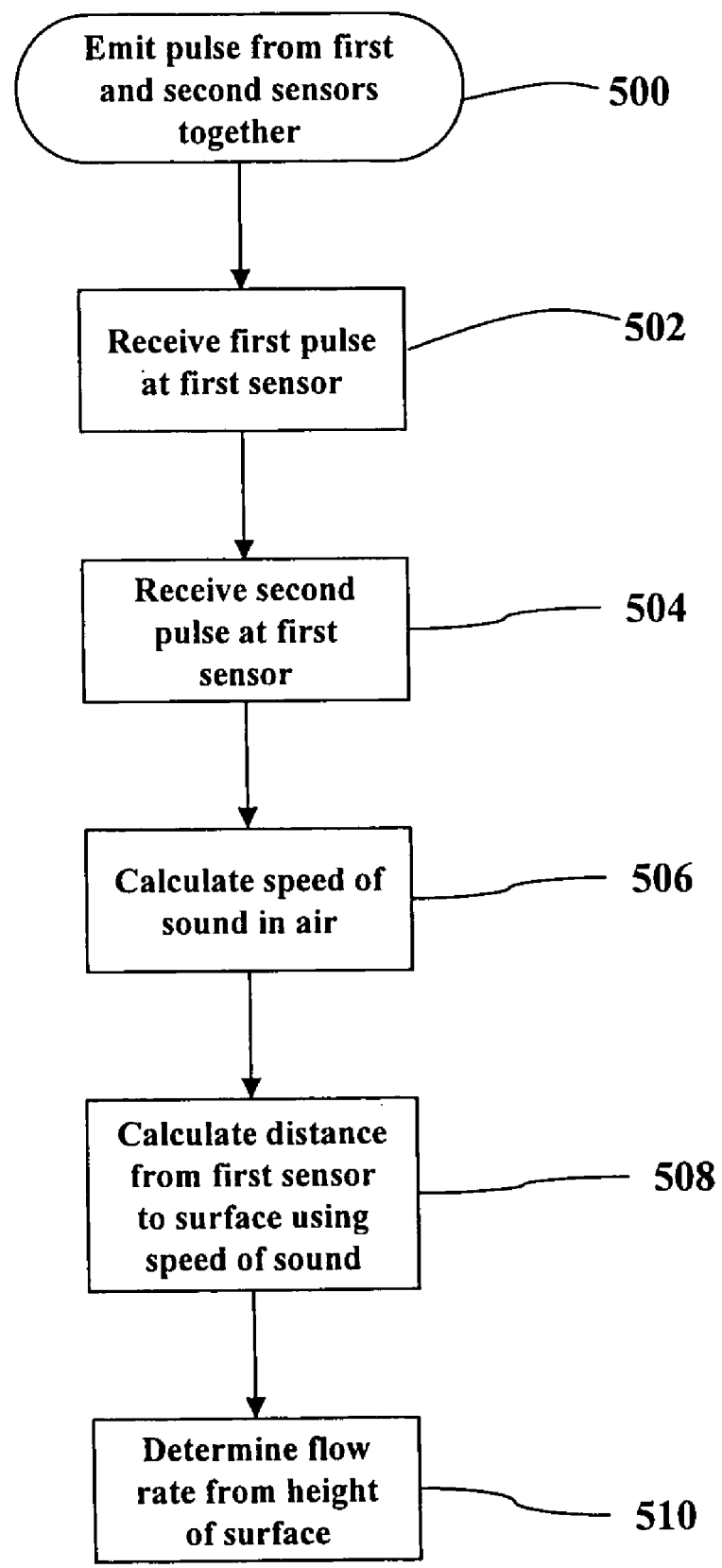
FIG. 5 is a flow chart outlining a method of using an embodiment of the invention.

In use (which is described in relation to the flow chart of FIG. 5), the processing circuitry is arranged to cause both of the sensors 100, 102 to emit a pulse at substantially the same time 500. In one embodiment, a pin (i.e. an input) which causes each of the sensors 100, 102 to emit a pulse when a voltage is applied thereto, are connected to one another to ensure that both of the sensors 100, 102 emit a pulse at the same time.

As will be seen from FIG. 2 the pulse emitted from the second sensor 102 travels a distance of $2h1+\Delta h$ before it is received at the first sensor 100. The pulse emitted from the first sensor 100 travels a distance of $2h1$ before it is received back at the first sensor 100.

Figure 3:
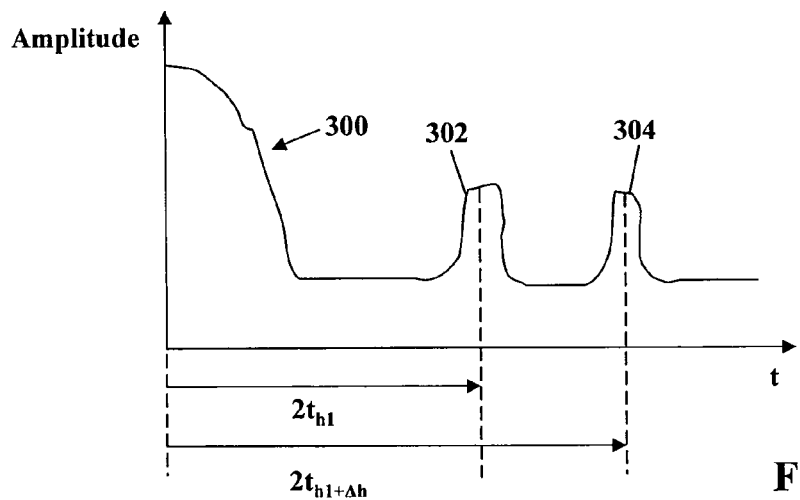
FIG. 3 schematically shows the outputs of a sensor of an embodiment of the invention.

Such pulses are schematically shown in FIG. 3. A region 300 to the left of the Figure indicates a time when the sensor 100 is still ringing after emitting the pulse. A first pulse 302 is received 502 at time 1 corresponding to a path traveled of $2h1$ and a second pulse 304 is received 504 at time 2 corresponding to a path traveled of $2h1+\Delta h$.

The distance between the two sensors 100, 102 (i.e. $\Delta h$) is known and as such the time difference between the first pulse 302 and the second pulse 304 is the time taken for the pulse to travel a distance of $\Delta h$. Therefore, the speed of sound in the current air conditions could be calculated and used to calibrate the time it takes the either of the pulses to reach the first sensor 100. Should the current speed of sound be determined, it would be appropriate to calculate it at step 506. However, in other embodiments, the speed of sound need not be calculated and subsequent calculations may be simply based upon the times that the pulses are received. Such a time based calculation inherently uses the actual speed of sound in the current conditions.

The first pulse 302 travels a distance of $2h_1$ and the second pulse 304 travels a distance of $2h_1+\Delta h$. Thus, the distance from either of the sensors 100, 102 to the surface 106 can be determined 508. This determination effectively uses the actual speed of sound in air for the present conditions it is calibrated according to the current conditions irrespective of the surrounding temperature or solar radiation patterns.

In the embodiment being described, it is the first sensor 100 which receives the pulses 302, 304 but this need not be the case and it would be possible for the second sensor 102, or indeed both, to act as a receiver.

In the embodiment shown in FIG. 4, the surface 106 is provided by the surface of the liquid 402 and knowing the distance from either of the sensors 100, 102 to the liquid surface allows the depth of the liquid in the channel 400 to be determined from the geometry of the channel 400.

Since the flow rate in the depth of the liquid in the exit end region 408 of the channel 400 is proportional to the flow rate knowing the depth of the liquid allows the flow rate to be determined 510 and the processing circuitry is further arranged to perform this calculation.

The invention claimed is:

1. A distance measurement apparatus arranged to measure the distance to an object, the apparatus comprising:
   a first sonic transmitter;
   a second sonic transmitter;
   wherein the first and second sonic transmitters are arranged to be at different distances from the object, the first and second transmitters being controlled by processing circuitry and the first and second transmitters being further arranged such that the first and second sonic pulses emitted respectively therefrom are incident upon the object; and
   a single sonic receiver arranged to receive reflected sonic pulses and generate an output therefrom;
   wherein the processing circuitry is arranged to receive the output, determine the times since the first and second pulses were emitted and generate a distance to the object from the determined times.

2. The distance measurement apparatus according to claim 1, wherein the first and second transmitters emit the first and second sonic pulses at substantially the same time.

3. The distance measurement apparatus according to claim 1, wherein the first and second sonic pulses are ultrasound pulses.

4. The distance measurement apparatus according to claim 1, wherein one of the sonic transmitters is also a receiver.

5. The distance measuring apparatus according to claim 1, wherein a sonic receiver is mounted at substantially the same distance from the object as one of the transmitters.

6. The distance measuring apparatus according to claim 1, wherein the first and second transmitters are arranged such that they emit the first and second sonic pulses which travel along lines substantially perpendicular to the object.

7. The distance measuring apparatus according to claim 1, in which the first and second transmitters are offset from one another, in a direction substantially transverse a perpendicular line between one of the first and second transmitters and the object.

8. The distance measuring apparatus according to claim 7, in which the offset is small such that a reflected sonic pulse received by the receiver has traveled substantially along a line perpendicularly to the receiver from the object.

9. The distance measuring apparatus according to claim 1, wherein the object to which a distance is to be measured comprises a surface of a liquid.

10. The distance measuring apparatus according to claim 9, in which the surface of a liquid is flowing through a weir or flume.

11. The distance measuring apparatus according to claim 10, wherein the processing circuitry is further arranged to utilize the distance measured to calculate the flow of liquid through a channel in which the weir or flume is positioned.

12. A method of measuring the distance to an object, the method comprising:
   timing a first time of flight of a first sonic pulse emitted from a transmitter at a first distance from the object;
   timing a second time of flight of a second sonic pulse emitted from a transmitter at a second distance from the object, and
   using the first and second times of flight to calculate the distance from a receiver to the object, the receiver used to receive the sonic pulses.

13. The method according to claim 12, wherein the sonic pulses are emitted from one or more transmitters at substantially the same time.

14. The method according to claim 12, wherein the sonic pulses comprise ultrasound.

15. The method according to claim 12, wherein one of the transmitters includes a receiver.

16. The method according to claim 12, wherein the method is utilized in measuring the level of a fluid in a tank or in determining the rate of flow of liquid in a channel.

17. A non-transitory machine readable medium comprising instructions that when read by a processing circuitry cause said processing circuitry to perform the method of claim 12.

* * * * *